July 29, 1924.
H. B. BINGMAN
ATTACHMENT FOR CORN SHELLERS
Filed June 4, 1923
1,503,149
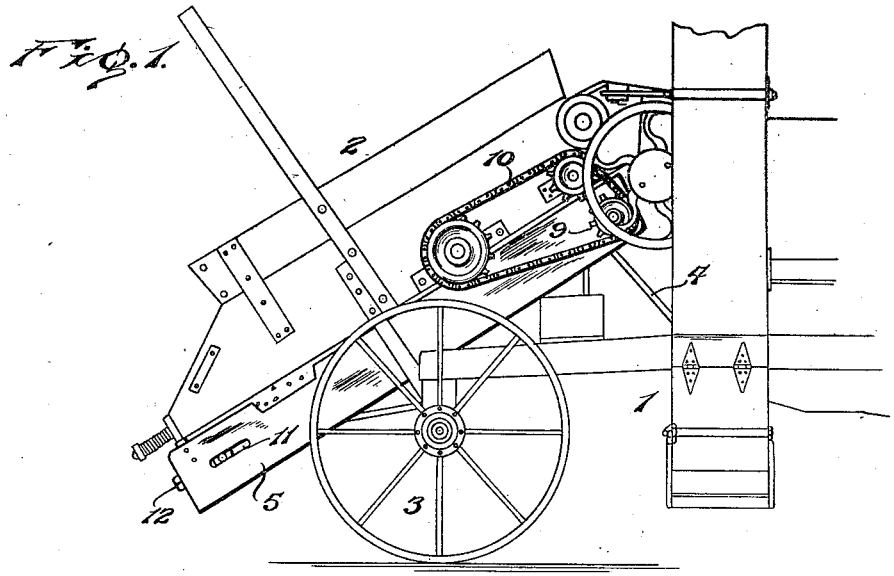
Fig. 1.
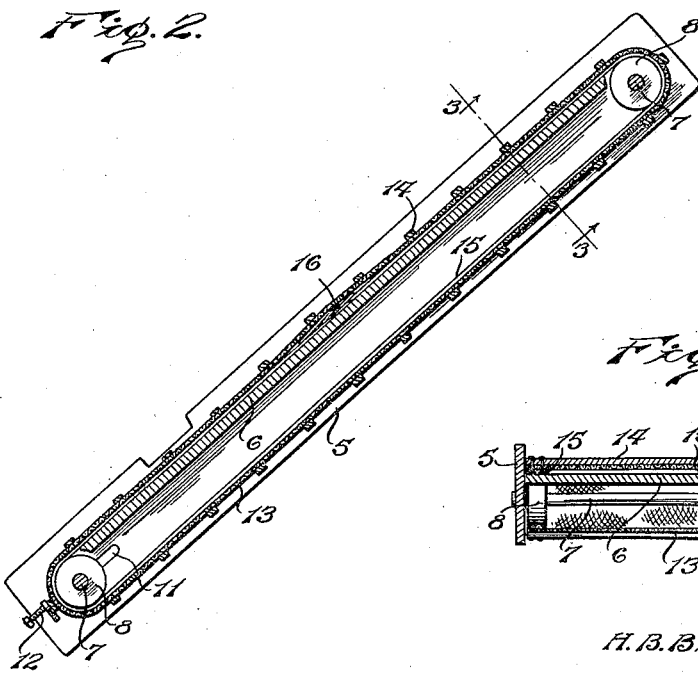
Fig. 2.
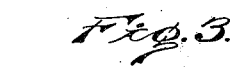
Fig. 3.
Inventor
H. B. Bingman
By
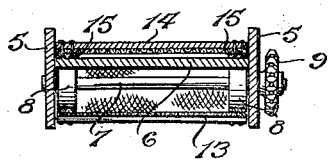
Attorneys Patented July 29, 1924.

1,503,149

UNITED STATES PATENT OFFICE.

HARRY B. BINGMAN, OF ROBINSON, KANSAS.

ATTACHMENT FOR CORN SHELLERS.

Application filed June 4, 1923. Serial No. 643,315.

*To all whom it may concern:*

Be it known that I, HARRY B. BINGMAN, a citizen of the United States, residing at Robinson, in the county of Brown and State of Kansas, have invented certain new and useful Improvements in Attachments for Corn Shellers, of which the following is a specification.

This invention is an attachment for corn-shelling machines and has for its object the provision of an inexpensive and simple mechanism which may be readily applied to a corn sheller between the shelling mechanism and the feeder and so disposed as to save the corn which is now lost by the action of the feeder. In the use of corn shellers, a feeder is customarily employed to receive the corn from the husking mechanism and deliver the same to the shelling mechanism. The handling of the corn loosens some of the kernels and these kernels escape through the ends of the feeder and are now generally permitted to drop to the ground, being subsequently gathered and delivered manually into the sheller so as to be cleaned and carried to the receptacle in which the other shelled corn is deposited. Necessarily, a considerable proportion of the corn so deposited upon the ground is lost, and in any event the gathering of the corn from the ground is a laborious and distasteful job which consumes time and adds to the cost of the operations. My invention provides a simple and efficient means whereby the corn is caught as it escapes from the feeder and is at once delivered into the sheller so that none of the corn is lost and the quantity of dirt passing into the sheller with the corn is minimized. One embodiment of the invention is illustrated in the accompanying drawing and will be hereinafter fully described, the novel features being subsequently particularly pointed out in the appended claim.

In the drawing:

Figure 1 is a side elevation showing my improved device in its operative relation to a corn sheller and a feeder;

Fig. 2 is a longitudinal section of the attachment removed from the sheller;

Fig. 3 is a detail transverse section on the line 3—3 of Fig. 2.

In the drawing, the reference numeral 1 indicates a portion of a corn sheller and 2 indicates a feeder arranged to deliver corn into the sheller, these parts being of any well-known or preferred construction and arrangement. The sheller is provided with supporting wheels 3 whereby it may be readily moved from place to place, and the feeder is disposed adjacent the receiving end of the sheller and so disposed as to deliver the corn into a chute 4 over which the corn passes into the sheller, as will be readily understood. In carrying out my invention, I support upon the axle of the wheels 3, in an inclined position, a trough consisting of side plates or rails 5 and a bottom or bridge plate 6 which is secured to and extends between the side rails below the upper edges of the same, as shown. The upper ends of the rails 5 are disposed over the chute 4 and the trough or frame consisting of the side rails and the transverse bridge plate is disposed immediately below the feeder, as shown and as will be readily understood. Adjacent the ends of the rails, transverse shafts 7 are mounted therein, and these shafts are equipped with pulleys 8 adjacent their ends. One end of the upper shaft 7 is extended through the adjacent side rail and equipped with a sprocket 9 to receive motion from a sprocket chain 10 forming part of the gearing whereby the feeder is driven. The lower shaft 7 is preferably mounted in slots 11 extending longitudinally of the side rails, and adjusting screws 12 are provided so that the said shaft and the rollers thereon may be shifted longitudinally of the side rails to maintain the proper tension of the conveyer apron 13 which is carried by the rollers 8, as shown. The said conveyer apron consists of a strip of canvas or similar flexible material having its ends joined in any convenient manner so that an endless apron is produced, slats 14, preferably of wood, being secured upon the outer face of the canvas strip at intervals to be carried thereby and engage the corn dropping from the feeder onto the conveyer so that the said corn will be caught and carried to the upper end of the conveyer and there discharged into the chute 4. The width of the conveyer 13 should be at least equal to the width of the feeder so that no corn dropping from the feeder may escape over the sides of the conveyer and the lower end of the conveyer preferably projects beyond the lower end of the feeder, as shown clearly in Fig. 1, so that corn escaping from the lower end of the feeder will be caught. The conveyer apron is preferably attached to two straps or belts 15 which are trained directly around the rollers 8 and have their ends joined by buckles 16 whereby an endless driving support for the conveyer apron is provided. The transverse slats 14 not only serve as means for catching the corn and preventing it from escaping over the lower end of the conveyer, but also reinforce the conveyer apron so that it will effectually sustain the weight of the corn caught by it. It will also be noted particularly upon reference to Fig. 3 that the straps or belts 15 ride directly upon the plate or board 6 so that sagging of the belts and the apron is overcome.

My improved device is obviously very simple in the construction and arrangement of its parts. It may be readily interposed between the feeder and the sheller of any known corn-shelling mechanism and may be driven from the same gearing which is now employed to actuate the shelling and feeding devices without imposing any substantial additional strain upon any of the working parts. By the use of my attachment all the corn which heretofore was permitted to drop to the ground, and a large proportion of which was lost, is saved and delivered into the sheller so that the yield of any given crop is materially increased over what it would be under the conditions heretofore generally prevailing.

Having thus described the invention, what is claimed as new is:

An attachment for corn shellers consisting of a pair of side rails adapted to be supported in an inclined position by the frame of the sheller with their upper edges abutting the lower edges of the feeder of the sheller, shafts mounted transversely in the rails adjacent the ends thereof, the shaft at the upper ends of the rails being extended laterally beyond one rail and equipped with a gear element, operative connections between said element and the driving gearing of the feeder, rollers carried by said shafts adjacent the ends thereof, the lower shaft and rollers being below the lower end of the feeder, belts trained around said rollers, and an endless apron carried by said belts and delivering into the receiving chute of the sheller.

In testimony whereof I affix my signature.

HARRY B. BINGMAN. [L. S.]